(12) United States Patent
Ohmori

(10) Patent No.: US 12,196,317 B2
(45) Date of Patent: Jan. 14, 2025

(54) SEALING DEVICE

(71) Applicant: UCHIYAMA MANUFACTURING CORP., Okayama (JP)

(72) Inventor: Kentaro Ohmori, Okayama (JP)

(73) Assignee: UCHIYAMA MANUFACTURING CORP., Okayama (JP)

( * ) Notice: Subject to any disclaimer, the term of this patent is extended or adjusted under 35 U.S.C. 154(b) by 0 days.

(21) Appl. No.: 18/352,905

(22) Filed: Jul. 14, 2023

(65) Prior Publication Data

US 2024/0019029 A1    Jan. 18, 2024

(30) Foreign Application Priority Data

Jul. 15, 2022 (JP) .................................. 2022-114167

(51) Int. Cl.
| | |
|---|---|
| *F16J 15/3264* | (2016.01) |
| *F16C 33/78* | (2006.01) |
| *F16C 33/80* | (2006.01) |
| *F16J 15/3232* | (2016.01) |
| *F16J 15/447* | (2006.01) |

(52) U.S. Cl.
CPC ........... *F16J 15/3264* (2013.01); *F16C 33/80* (2013.01); *F16C 33/805* (2013.01); *F16J 15/3232* (2013.01); *F16J 15/4478* (2013.01); *F16C 33/7883* (2013.01)

(58) Field of Classification Search
CPC .... F16J 15/3232; F16J 15/3264; F16J 15/447; F16J 15/4472; F16J 15/4474; F16J 15/4476; F16J 15/4478; F16C 33/7883; F16C 33/7889; F16C 33/80; F16C 33/805
See application file for complete search history.

(56) References Cited

U.S. PATENT DOCUMENTS

| | | | |
|---|---|---|---|
| 5,813,675 A * | 9/1998 | Otto ..................... | F16C 33/7896 277/572 |
| 7,675,212 B2 * | 3/2010 | Kobayashi ............. | F16J 15/326 310/90.5 |
| 9,925,830 B2 * | 3/2018 | Barberis ............. | F16C 33/7883 |
| 10,605,369 B2 | 3/2020 | Kato | |

(Continued)

FOREIGN PATENT DOCUMENTS

| | | | |
|---|---|---|---|
| JP | 6717524 B2 | 7/2020 | |
| JP | 6805154 B2 | 12/2020 | |

*Primary Examiner* — Nicholas L Foster
(74) *Attorney, Agent, or Firm* — Muncy, Geissler, Olds & Lowe, P.C.

(57) ABSTRACT

A sealing device for sealing an annular space formed between an outer member and an inner member. The sealing device includes a seal member and a slinger member, the slinger member includes a slinger extension ring portion provided on an outer side in radial direction further than an outer diameter side end portion of a slinger ring portion, facing an axially outer side end surface of the outer member, and extending in radial direction. A first labyrinth extending in radial direction is formed between the slinger extension ring portion and the outer member, an outer side end portion of the first labyrinth in radial direction opening toward an outer space. A second labyrinth extending in axial direction is formed between an outer diameter side slinger cylindrical portion and a seal fitting cylindrical portion, the second labyrinth communicating with the first labyrinth.

12 Claims, 6 Drawing Sheets

(56) References Cited

U.S. PATENT DOCUMENTS

| | | | |
|---|---|---|---|
| 11,009,075 B2 | 5/2021 | Mitsuishi et al. | |
| 2016/0003302 A1* | 1/2016 | Seno | F16J 15/3232 |
| | | | 277/351 |
| 2016/0347120 A1* | 12/2016 | Barberis | F16C 33/805 |
| 2018/0156336 A1 | 6/2018 | Kato | |
| 2018/0258995 A1 | 9/2018 | Mitsuishi et al. | |

* cited by examiner

SEALING DEVICE

BACKGROUND OF THE INVENTION

Field of the Invention

The present invention relates to a sealing device for sealing an annular space, the sealing device being provided on an axially outer side end portion of the annular space between an outer member and an inner member which coaxially rotate in a relative manner, the outer side end portion being on the outer space side.

Description of the Related Art

For example, a bearing device of a wheel of an automobile or the like is equipped with a sealing device that seals a space between the outer member and the inner member as mentioned above in order to inhibit the intrusion of foreign substances such as muddy water and dust from the outside. In such a sealing device, a seal lip provided for a seal member contacts a slinger member, thereby inhibiting foreign substances such as muddy water that have entered from the outside from entering the inside of the bearing device.

In the above-mentioned sealing device, the larger the number of seal lips in contact with the slinger member, the higher the effect of inhibiting the intrusion of foreign substances such as muddy water into the bearing device. However, in such a sealing device, there is a problem in that the torque tends to increase accordingly as the number of seal lips in contact with the slinger member increases.

Therefore, in Patent Documents 1 and 2 below, such a structure that the labyrinth, being a gap, between the members is bent, inhibits the increase of the torque and the intrusion of foreign substances such as muddy water.

RELATED ART DOCUMENTS

[Patent Document 1] Japanese Patent No. 6717524
[Patent Document 2] Japanese Patent No. 6805154

SUMMARY OF THE INVENTION

Problems to be Solved by the Invention

In Patent Documents 1 and 2, since the slinger member has a structure to cover the outer peripheral surface of the outer member in order to inhibit the intrusion of foreign substances such as muddy water, it might be difficult for the foreign substances such as muddy water to be discharged from the sealing device once the foreign substances enter the inside of the slinger member.

The present invention has been made in view of the above circumstances, and has an object to provide a sealing device that inhibits the intrusion of foreign substances such as muddy water by restraining the increase in torque and improves the effect of quickly discharging the foreign substances into the external space even when the foreign substances have entered the sealing device.

Means of Solving the Problems

In order to achieve the above-mentioned object, the present invention proposes a sealing device for sealing an annular space, the sealing device being attached on an axially outer side end portion of the annular space formed between an outer member and an inner member which coaxially rotate in a relative manner, the axially outer side end portion of the annular space being on an outer space side. The sealing device includes a seal member to be fitted to an inner peripheral surface of the outer member and a slinger member to be fitted to an outer peripheral surface of the inner member. The seal member includes a core body and a seal lip which is integrated with the core body and is constituted with an elastic body in contact with the slinger member. The core body includes a seal fitting cylindrical portion to be fitted to the inner peripheral surface of the outer member and an inner diameter side seal ring portion extending into an inner side in radial direction from an axially inner side end portion of the seal fitting cylindrical portion. The slinger member includes a slinger fitting cylindrical portion to be fitted to the outer peripheral surface of the inner member, a slinger ring portion extending from an axially outer side end portion of the slinger fitting cylindrical portion to an outer side in radial direction, an outer diameter side slinger cylindrical portion extending from an outer diameter side end portion of the slinger ring portion to an axially inner side and facing an inner peripheral surface of the seal fitting cylindrical portion, and a slinger extension ring portion provided on an outer side in radial direction further than the outer diameter side end portion of the slinger ring portion, facing an axially outer side end surface of the outer member, and extending in radial direction. A first labyrinth is formed between the slinger extension ring portion and the outer member, an outer side end portion of the first labyrinth in radial direction being open toward an outer space, the first labyrinth being a gap extending in radial direction. A second labyrinth is formed between the outer diameter side slinger cylindrical portion and the seal fitting cylindrical portion, the second labyrinth communicating with the first labyrinth and being a gap extending in axial direction.

In the above-mentioned sealing device, the core body can further include an outer diameter side seal ring portion extending from an axially outer side end portion of the seal fitting cylindrical portion to an outer side in radial direction so as to face the axially outer side end surface of the outer member. The first labyrinth can be formed between the outer diameter side seal ring portion and the slinger extension ring portion.

In the above-mentioned sealing device, the outer diameter side seal ring portion can have a cover constituted with an elastic body on an axially outer side surface, and the first labyrinth can be formed between the cover and the slinger extension ring portion.

In the above-mentioned sealing device, a plurality of protrusions can be provided on an axially outer side surface of the cover, the protrusions projecting outward in axial direction and being provided annularly along circumferential direction.

In the above-mentioned sealing device, a plurality of protrusions can be provided on an axially inner surface of the slinger extension ring portion, the protrusions projecting inward in axial direction and being provided annularly along circumferential direction.

In the above-mentioned sealing device, the protrusions provided for the slinger extension ring portion can be formed so as to increase in diameter inward in axial direction.

Effects of the Invention

The sealing device of the present invention constituted as mentioned above inhibits the intrusion of foreign substances such as muddy water by restraining the increase in torque and improves the effect of quickly discharging the foreign substances into the external space even when the foreign substances enter the sealing device.

DESCRIPTION OF THE EMBODIMENTS

First Embodiment

Figure 1:
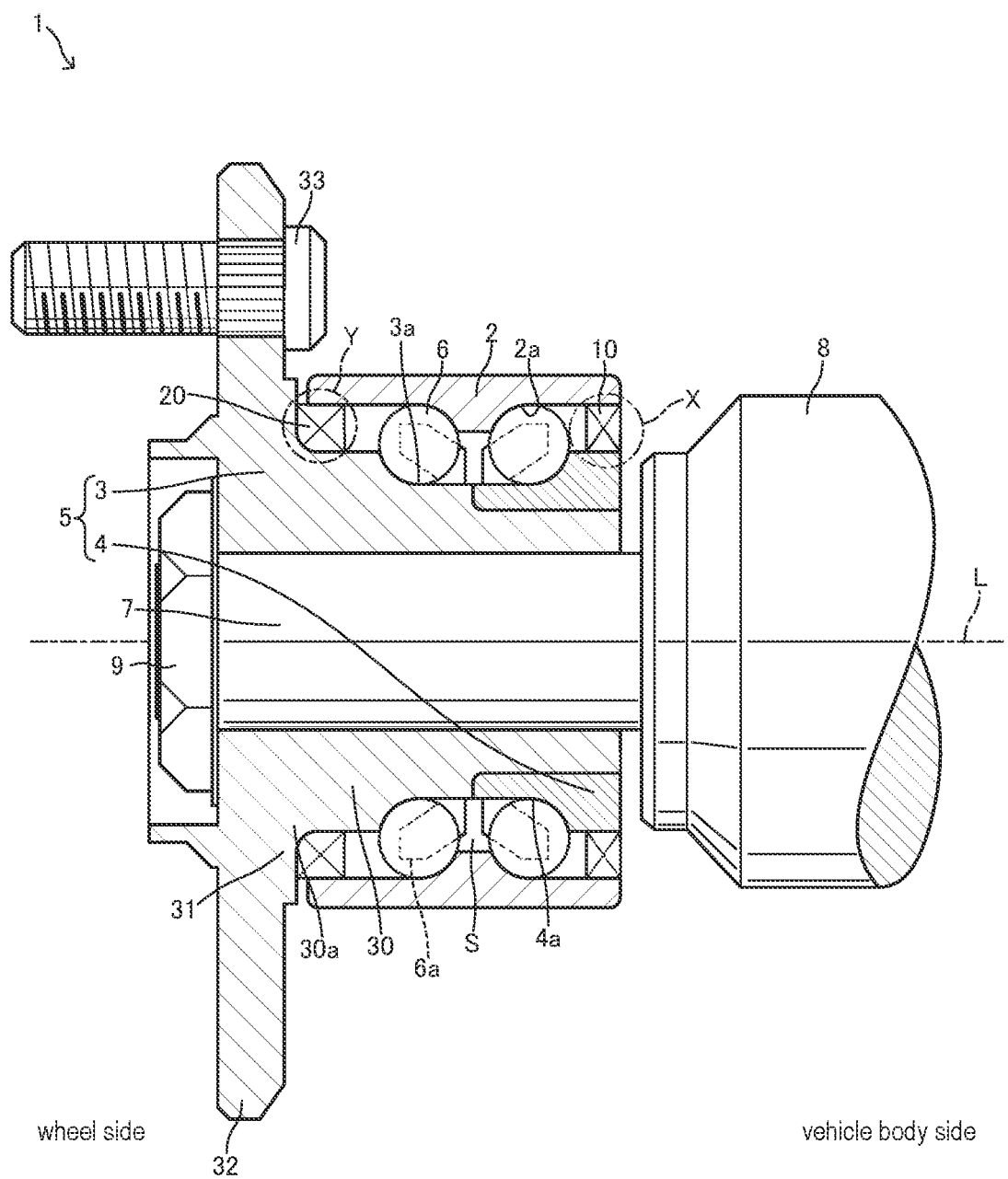
FIG. 1 is a schematic longitudinal sectional view illustrating an example of a bearing device to which the sealing device according to the first embodiment is attached.

Hereinafter, each embodiment is described based on the drawings. In some figures, some of the detailed symbols allotted to other figures are omitted. In the following description, the side facing the wheel along the axis L, i.e., the left side in FIG. 1 and so on, is set to be the wheel side, and the side facing the vehicle body, i.e., the right side in FIG. 1 and so on, is set to be the vehicle body side. Further, the outer side in the radial direction is sometimes described as the outer diameter side, and the inner side in the radial direction is sometimes described as the inner diameter side. In the figures, the portion indicated with the two-dot chain line of the seal lip is the original shape before deformation. First, a sealing device 10 according to the first embodiment is described with reference to FIG. 1 and FIG. 2.

The sealing device 10 according to the first embodiment is attached to the outer side end portion in the axial direction that is an external space side of an annular space S formed between the outer member "2" and the inner member "5" that rotate relatively and coaxially, thereby sealing the annular space S. The sealing device 10 has a seal member 11 to be fitted to an inner peripheral surface 2c of the outer member "2" and a slinger member 14 to be fitted to an outer peripheral surface 4b of the inner member "5". The seal member 11 has a core body 12 and a seal lip constituted with an elastic body that is integrally provided on the core body 12 and is in contact with the slinger member 14. The core body 12 has a seal fitting cylindrical portion 121 to be fitted to the inner peripheral surface 2c of the outer member "2", and an inner diameter side seal ring portion 122, i.e. a ring portion of the seal member on the inner diameter side, extending from the axially inner side end portion, i.e., the end portion on the wheel side, 121c of the seal fitting cylindrical portion 121 into the inner side in the radial direction. The slinger member 14 has a slinger fitting cylindrical portion 141, a slinger ring portion 142, an outer diameter side slinger cylindrical portion 143, i.e., a cylindrical portion of the slinger member on the outer diameter side, and a slinger extension ring portion 15. A slinger fitting cylindrical portion 141 is fitted to the outer peripheral surface 4b of the inner member "5". A slinger ring portion 142 extends from an axially outer side end portion, i.e., vehicle body side end portion, 141d of the slinger fitting cylindrical portion 141 to the outer side in the radial direction. An outer diameter side slinger cylindrical portion 143, i.e., a cylindrical portion of the slinger member on the outer diameter side, extends from an outer diameter side end portion 142d of the slinger ring portion 142 to the axially inner side, i.e., wheel side, and faces an inner peripheral surface 121a of the seal fitting cylindrical portion 121. The slinger extension ring portion 15 is provided on the outer side in the radial direction further than the outer diameter side end portion 142d of the slinger ring portion 142, and extends in the radial direction opposite to the axially outer side, i.e., vehicle body side, end surface 2d of the outer member "2". The first labyrinth R1 is provided between the slinger extension ring portion 15 and the outer member "2", the first labyrinth R1 being a gap of which outer side end portion in the radial direction opens toward the external space and extending in the radial direction. The second labyrinth R2 is provided between the outer diameter side slinger cylindrical portion 143 and the seal fitting cylindrical portion 121, the second labyrinth R2 being a gap that communicates with the first labyrinth R1 and extends in the axial direction.

Detailed description is as below.

FIG. 1 illustrates a bearing device 1 that supports automobile wheels, not shown, in an axially rotatable manner. The bearing device 1 generally has an outer ring 2 being the above mentioned outer member, an inner ring 5 being the above mentioned inner member, and two rows of rolling elements, i.e., balls, 6 . . . interposed between the outer ring 2 and the inner ring 5. The inner ring 5 constitutes a rotary member including a hub wheel 3 and an inner ring member 4, the inner ring member 4 being integrally fitted to the vehicle body side of the hub wheel 3. A drive shaft 7 is coaxially spline-fitted to the hub wheel 3 and is connected to a drive source, i.e., a drive transmission portion, not shown, via a constant velocity joint 8. The drive shaft 7 is integrated with the hub wheel 3 by a nut 9 to prevent the hub wheel 3 from falling off from the drive shaft 7. The inner ring 5, i.e., the hub wheel 3 and the inner ring member 4, is a rotary member capable of rotating about the axis L with respect to the outer ring 2, the outer ring 2 and the inner ring 5 constitute two members that rotate relatively, and an annular space S is formed. The annular space S houses two rows of rolling elements 6 . . . held by a retainer 6a so as to be able to rotate a track wheel 2a of the outer ring 2, a track wheel 3a of the hub wheel 3, and a track wheel 4a of the inner ring member 4. The hub wheel 3 includes a cylindrical hub wheel body 30 and a hub flange 32 formed so as to extend outward in the radial direction from the hub wheel body 30 via a rising base 31, and the wheel is attached to be fixed to the hub flange 32 by a bolt 33 and a nut, not shown.

Figure 2:
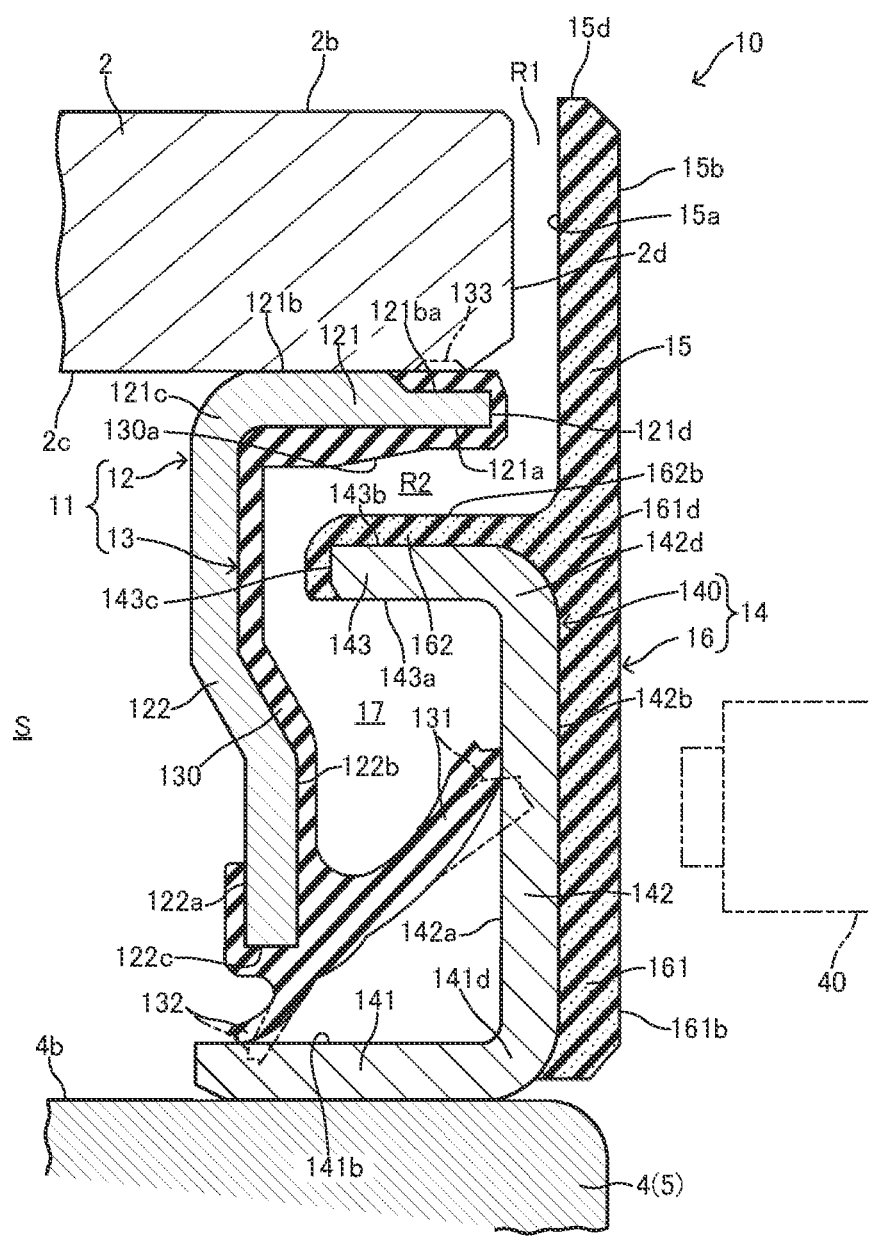
FIG. 2 is an enlarged view of the part X of FIG. 1, and is a schematic longitudinal sectional view diagrammatically illustrating the sealing device according to the embodiment.

FIG. 2 is a partial sectional view obtained by enlarging the portion X of FIG. 1, and FIG. 2 illustrates the sealing device 10 according to the first embodiment. The sealing device 10 is attached to the axially outer side end portion between the outer ring 2, on the vehicle body side and the inner ring member 4 and seals the annular space S. Next, each member constituting the sealing device 10 is described. In FIG. 2 to FIG. 5, the outside in the axial direction is described as the vehicle body side and the inside in the axial direction is described as the wheel side.

The seal member 11 includes the core body 12 and a seal portion 13 having a seal lip. The core body 12 is formed by pressing a steel plate such as SPCC or SUS and is a cylindrical shape, the section of which on one side is an approximately inverted L-shape as illustrated in FIG. 2. The core body 12 includes the seal fitting cylindrical portion 121 to be fitted to the inner peripheral surface 2c of the outer ring 2 and the inner diameter side seal ring portion 122 extending from the inner diameter side end portion 121c of the seal fitting cylindrical portion 121 to the inner diameter side.

The seal portion 13 is constituted with an elastic body such as rubber and is integrally molded to the core body 12 by vulcanization adhesion. The seal portion 13 includes a seal base 130, a side lip 131, a radial lip 132 that are seal lips extending from the seal base 130, and an annular protrusion 133. The two-dot chain line of the seal portion 13 in the figure indicates the original shape before deformation.

The seal base 130 covers part of an inner diameter side of a wheel side surface 122a of the inner diameter side seal ring portion 122 of the core body 12, wraps around an inner diameter side end portion 122c of the inner diameter side seal ring portion 122, and covers the entire surface of a vehicle side surface 122b of the inner diameter side seal ring portion 122. Further, the seal base 130 covers the entire surface of the inner peripheral surface 121a of the seal fitting cylindrical portion 121, wraps around a vehicle body side end portion 121d, and reaches a recess 121ba provided on the vehicle body side of the outer peripheral surface 121b of the seal fitting cylindrical portion 121, the recess 121ba being dented into the inner diameter side. An annular protrusion 133 bulged on the outer diameter side is formed on the outer peripheral side of the seal base 130 that has reached the recess 121ba.

The side lip 131 gradually expands in the diameter while extending from the seal base 130 to the vehicle body side and slidably and elastically comes into contact a wheel side surface 142a of the slinger ring portion 142 of the slinger member 14. The radial lip 132 gradually reduces in the diameter while extending from the seal base 130 to the wheel side and slidably and elastically comes into contact with an outer peripheral surface 141b of the slinger fitting cylindrical portion 141 of the slinger member 14.

The slinger member 14 includes a slinger base 140 and a slinger cover 16. The slinger base 140 is formed by pressing a steel plate such as SPCC or SUS and is a cylindrical shape, the section of which on one side is an approximately inverted C-shape as illustrated in FIG. 2. The slinger member 14 includes the slinger fitting cylindrical portion 141 to be fitted to the outer peripheral surface 4b of the inner ring member 4 which is the inner member. The slinger member 14 also includes the slinger ring portion 142 extending from the vehicle body side end portion 141d of the slinger fitting cylindrical portion 141 to the outer diameter side. The slinger member 14 further includes the outer diameter side slinger cylindrical portion 143 extending from the outer diameter side end portion 142d of the slinger ring portion 142 to the wheel side. The slinger base 140 is constituted with the slinger fitting cylindrical portion 141, the slinger ring portion 142, and the outer diameter side slinger cylindrical portion 143 of the slinger member 14.

Further, a slinger cover 16 made of magnetic rubber is fixed to the slinger base 140. The slinger cover 16 includes a vehicle body side cover portion 161 that covers almost the entire of a vehicle body side surface 142b of the slinger ring portion 142, and an outer diameter side cover portion 162 that covers the entire of an outer peripheral surface 143b of the outer diameter side slinger cylindrical portion 143 and a wheel side end portion 143c. The slinger cover 16 is configured so as not to cover an inner peripheral surface 143a of the outer diameter side slinger cylindrical portion 143 and the wheel side surface 142a of the slinger ring portion 142.

The slinger member 14 has a slinger extension ring portion 15 that extends to the outer diameter side so as to face the vehicle body side end surface 2d of the outer ring 2, which is the outer member. The slinger extension ring portion 15 of the embodiment of the present invention is a magnetic rubber member extending from an outer diameter side end portion 161d of the vehicle body side cover portion 161 of the slinger cover 16 to the outer diameter side further than an outer peripheral surface 2b of the outer ring 2. Thus, the slinger extension ring portion 15 is provided such that the outer diameter side end portion 15d is located outside in the radial direction further than the outer diameter side end portion 142d of the slinger ring portion 142.

A vehicle body side surface 15b of the slinger extension ring portion 15 and a vehicle body side surface 161b of the vehicle body side cover portion 161 are configured to be on the approximately same level. Further, the vehicle body side cover portion 161 and the slinger extension ring portion 15 are magnetized by the N poles and the S poles provided alternately in the circumferential direction. The vehicle body side cover portion 161 is provided so as to face a magnetic sensor 40 provided for the vehicle body, and the rotation speed of the wheel or the like is detected by the magnetic sensor 40 and the vehicle body side cover portion 161. That is, the vehicle body side cover portion 161 of the embodiment of the present invention constitutes an annular magnetic encoder.

The sealing device 10 attached to the bearing device 1 includes the first labyrinth R1, which is a gap extending in the radial direction between a wheel side surface 15a of the slinger extension ring portion 15 and the vehicle body side end surface 2d of the outer ring 2. The outer diameter side end portion of the first labyrinth R1 opens toward the external space. Further, the sealing device 10 includes the second labyrinth R2, which is a gap communicating with the first labyrinth R1 and extending in the axial direction between the outer diameter side slinger cylindrical portion 143 of the slinger member 14 and the seal fitting cylindrical portion 121 of the seal member 11. The second labyrinth R2 of the embodiment of the present invention is formed between an outer peripheral surface 162b of the outer diameter side cover portion 162 fixed to the outer peripheral surface 143b of the outer diameter side slinger cylindrical portion 143 and the seal base 130 fixed to the inner peripheral surface 121a of the seal fitting cylindrical portion 121. Part of the seal base 130 that is fixed to the inner peripheral surface 121a of the seal fitting cylindrical portion 121 includes an inclined inner peripheral surface 130a inclined on the outer diameter side toward the vehicle body side. The inclined inner peripheral surface 130a faces the outer peripheral surface 162b of the outer diameter side cover portion 162 in the radial direction, thereby constituting a part of the second labyrinth R2.

The sealing device 10 of the embodiment of the present invention includes the first labyrinth R1 which is a gap extending in the radial direction, and the second labyrinth R2 which communicates with the first labyrinth R1 and extends in the axial direction, thereby constituting a labyrinth of which path is long and curved. Therefore, even if a plurality of seal lips are not provided, it is configured so as to prevent the intrusion of foreign substances such as muddy water into the inside of the bearing device 1. Further, since the first labyrinth R1 extends in the radial direction and the outer side end portion in the radial direction opens toward the external space, even when foreign substances such as muddy water enter the sealing device 10, the foreign substances are easily discharged to the outside by the centrifugal force generated by the rotation of the bearing device 1. In the embodiment, since the first labyrinth R1 is a gap extending linearly in the radial direction on the sectional shape on one side, the discharge effect of foreign substances due to the centrifugal force generated by the rotation of the bearing device 1 is further enhanced.

The second labyrinth R2 has a configuration in which the inner peripheral surface 121a of the seal fitting cylindrical portion 121 includes the inclined inner peripheral surface 130a of the seal base 130. Therefore, even when foreign substances such as muddy water enter the second labyrinth R2, the foreign substances are easily discharged by the centrifugal force generated by the rotation of the bearing device 1 to the first labyrinth R1 side along the inclined inner peripheral surface 130a. Further, since the seal lip in contact with other members is not provided in the first labyrinth R1 and the second labyrinth R2, the increase in torque is inhibited.

Further, the slinger extension ring portion 15 is configured to face the vehicle body side end surface 2d, which is the axially outer side end surface of the outer ring 2. Therefore, the vehicle body side end surface 2d of the outer ring 2 is configured so as to be covered by the slinger extension ring portion 15 at intervals, and foreign substances such as muddy water are less likely to directly splash. Furthermore, since the outer diameter side end portion 15d of the slinger extension ring portion 15 is located on the outer diameter side of the outer peripheral surface 2b of the outer ring 2, the vehicle body side end surface 2d of the outer ring 2 is less likely to be exposed to the foreign substances. Since the foreign substances are less likely to splash the vehicle body side end surface 2d of the outer ring 2, the foreign substances are inhibited from entering the sealing device 10 along the vehicle body side end surface 2d. Furthermore, the foreign substances are inhibited from entering between the seal fitting cylindrical portion 121 of the core body 12 and the inner peripheral surface 2c of the outer ring 2 of the sealing device 10 along the vehicle body side end surface 2d of the outer ring 2.

Further, the sealing device 10 includes the inner peripheral surface 143a of the outer diameter side slinger cylindrical portion 143, the wheel side surface 142a of the slinger ring portion 142, the side lip 131, and a space 17 surrounded by the seal base 130 fixed to the vehicle body side surface 122b of the inner diameter side seal ring portion 122. The space 17 communicates with the second labyrinth R2, accumulates the foreign substances that have passed through the second labyrinth R2, and prevents further intrusion. Then, the discharge of the foreign substances that have reached the space 17 from the sealing device 10 is promoted as the bearing device 1 rotates.

Thus, the sealing device 10 of the embodiment of the present invention has the above-mentioned configuration, suppresses the increase in torque, inhibits the entry of foreign substances such as muddy water, and improves the effect of quickly discharging the foreign substances into the external space even when the foreign substances enter the sealing device 10.

Second Embodiment

Next, a sealing device 10A according to the second embodiment of the present invention is described with reference to FIG. 3. The description of the configuration and effect of the portion common to that of the sealing device 10 of the first embodiment is omitted.

In the second embodiment, the core body 12 further includes an outer diameter side seal ring portion 123, i.e., a ring portion of the seal member on an outer diameter side, extending outward in the radial direction from the vehicle body side end portion 121d of the seal fitting cylindrical portion 121 opposite to the vehicle body side end surface 2d of the outer ring 2. The outer diameter side seal ring portion 123 has a cover portion 134 constituted with an elastic body on a vehicle body side surface 123b. The first labyrinth R1 is configured between the cover portion 134 provided for the outer diameter side seal ring portion 123 and the slinger extension ring portion 15.

It is described in detail below.

The core body 12 of the seal member 11 is the same as that in the first embodiment in that the core body 12 includes the seal fitting cylindrical portion 121 and the inner diameter side seal ring portion 122. Further, the core body 12 of the present embodiment includes the outer diameter side seal ring portion 123 extending outward in the radial direction from the vehicle body side end portion 121d of the seal fitting cylindrical portion 121 so as to face the vehicle body side end surface 2d of the outer ring 2. The outer diameter side seal ring portion 123 is configured such that an outer diameter side end portion 123d is located on the outer diameter side of the outer peripheral surface 2b of the outer ring 2.

In the seal portion 13, the seal base 130 covers part of the inner diameter side of the wheel side surface 122a and the inner diameter side end portion 122c of the inner diameter side seal ring portion 122, the whole of the vehicle body side surface 122b of the inner diameter side seal ring portion 122, and the whole of the inner peripheral surface 121a of the seal fitting cylindrical portion 121. Further, the seal base 130 wraps around the vehicle body side end portion 121d of the seal fitting cylindrical portion 121, entirely covers the vehicle body side surface 123b of the outer diameter side seal ring portion 123, wraps around the outer diameter side seal ring portion 123, and covers part of the outer diameter side of the wheel side surface 123a. The seal base 130 of the region which covers part of the outer diameter side of a wheel side surface 123a of the outer diameter side seal ring portion 123 is interposed under pressure between the wheel side surface 123a of the outer diameter side seal ring portion 123 and the vehicle body side end surface 2d of the outer ring 2, thereby inhibiting the intrusion of foreign substances such as muddy water.

The region of the seal base 130 covering the vehicle body side surface 123b of the outer diameter side seal ring portion 123 is the cover portion 134 provided on the vehicle body side surface 123b of the outer diameter side seal ring portion 123. A vehicle body side surface 134b of the cover portion 134 has a plurality of annular protrusions 135 protruding toward the vehicle body side and being formed in an annular shape along the circumferential direction. The protrusion 135 is shaped so as to gradually reduce in the diameter toward the vehicle body side. Further, three protrusions 135 are formed in a spaced way in the radial direction and are configured close to the slinger extension ring portion 15 so as not to come into contact with each other. In the embodiment of the present invention, the outermost diameter side end portion 130d of the seal base 130 covering the outer diameter side end portion of the outer diameter side seal ring portion 123 is positioned on the outer diameter side further than the outer diameter side end portion 15*d* of the slinger extension ring portion 15 of the slinger member 14.

The seal portion 13 in the embodiment includes the radial lip 132 as a seal lip and does not include the side lip 131 of the first embodiment. The radial lip 132 reduces in the diameter from the seal base 130 toward the vehicle body side and is in elastic contact with the outer peripheral surface 141*b* of the slinger fitting cylindrical portion 141. Further, a vehicle body side tip portion 132*d* of the radial lip 132 bulges on the outer diameter side. The shape of the tip portion 132*d* simulates the annular spring in which coil springs are connected in an annular shape. The vehicle body side tip portion 132*d* of the radial lip 132 simulates the annular spring, so that the sealing performance is further improved in the same way as the case in which the annular spring is attached to the outer peripheral surface of the radial lip 132.

The seal portion 13 is located between the slinger fitting cylindrical portion 141 of the slinger member 14 and the outer diameter side slinger cylindrical portion 143, and includes a seal cylindrical portion 136 extending from the seal base 130 to the vehicle body side. The seal cylindrical portion 136 is configured to be located in the space 17 of the first embodiment and not to come into contact with the slinger member 14. An inner peripheral surface 136*a* of the seal cylindrical portion 136 inclines to the outer diameter side toward the vehicle body side. Further, an outer peripheral surface 136*b* of the seal cylindrical portion 136 is provided with a plurality of seal protrusions 137 that protrude outward in the radial direction and are formed in an annular shape along the circumferential direction. The seal protrusion 137 expands in the diameter to the vehicle body side and faces the inner peripheral surface 143*a* of the outer diameter side slinger cylindrical portion 143 in the radial direction. Three seal protrusions 137 are formed at intervals with each other in the axial direction.

Figure 3:
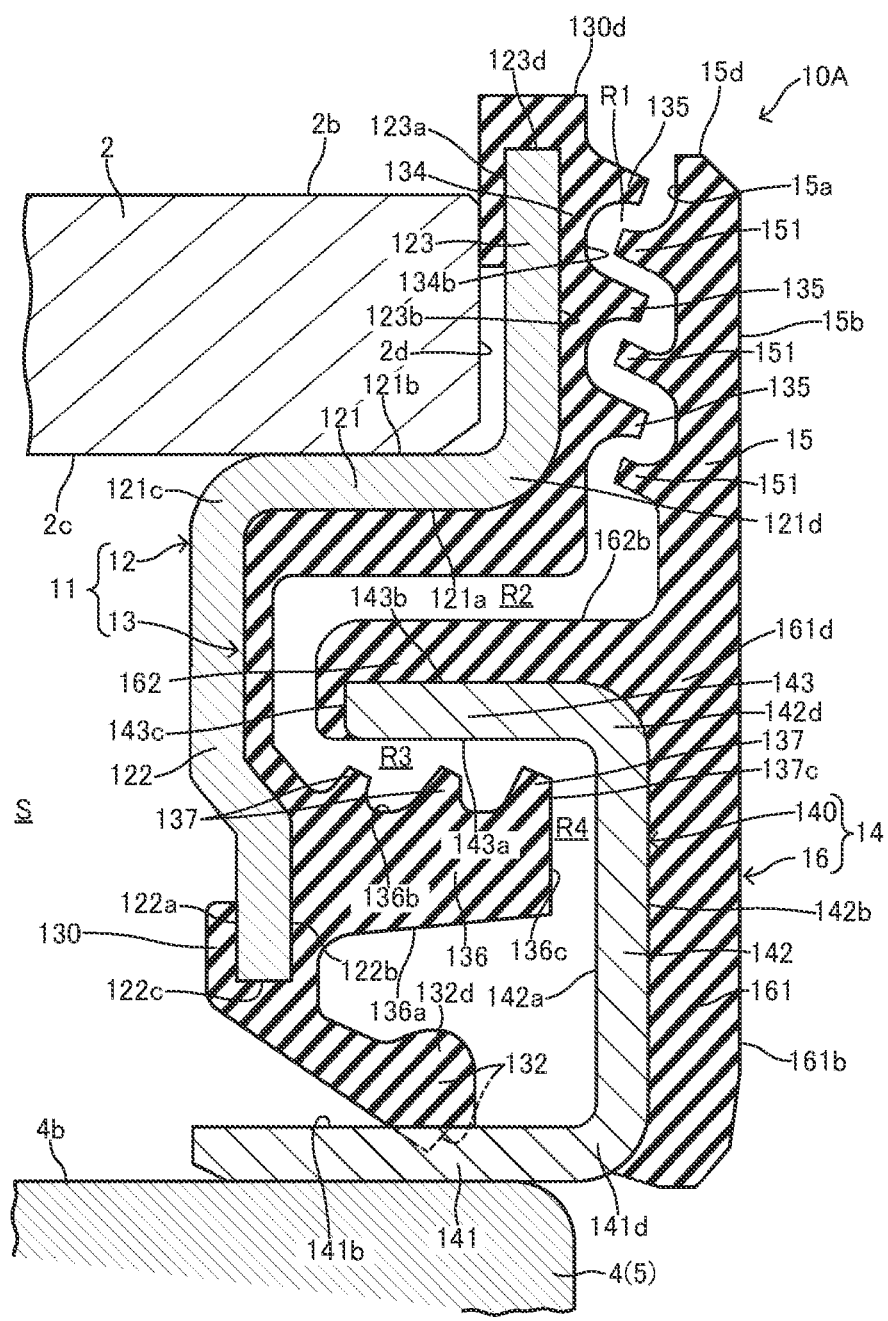
FIG. 3 is a schematic longitudinal sectional view diagrammatically illustrating a sealing device according to the second embodiment.

The slinger member 14 is formed by pressing a steel plate such as SPCC or SUS as in the first embodiment, and includes a cylindrical slinger base 140, the section of which on one side is an approximately inverted C-shape and the slinger cover 16 to be fixed to the slinger base 140 as illustrated in FIG. 3. Unlike the first embodiment, the slinger cover 16 is not made of magnetic rubber, but of an elastic rubber body that does not have magnetism. Therefore, the slinger cover 16 of the present embodiment does not function as a magnetic encoder.

The slinger cover 16 has the slinger extension ring portion 15 extending from the outer diameter side end portion 161*d* of the vehicle body side cover portion 161 to the outer diameter side further than the outer peripheral surface 2*b* of the outer ring 2. The wheel side surface 15*a* of the slinger extension ring portion 15 has a plurality of protrusions 151 protruding toward the wheel side and being formed in an annular shape along the circumferential direction. The protrusion 151 is formed in a shape expanding in the diameter toward the wheel side. Further, three protrusions 151 are formed at intervals in the radial direction.

Three protrusions 135 of the cover portion 134 and three protrusions 151 of the slinger extension ring portion 15 are formed and are formed alternately at intervals in the radial direction. Further, the protrusion 135 of the cover portion 134 and the protrusion 151 of the slinger extension ring portion 15 overlap each other in the radial direction and protrude so as not to come into contact with the other member. The first labyrinth R1 is formed by the vehicle body side surface 134*b* and the protrusion 135 of the cover portion 134, and the wheel side surface 15*a* and the protrusion 151 of the slinger extension ring portion 15, thereby constituting a labyrinth of a meandering gap on the longitudinal sectional shape. In the present embodiment, the protrusion 135 on the outermost diameter side of the cover portion 134 is located on the outer diameter side further than the protrusion 151 on the outermost diameter side of the slinger extension ring portion 15. Further, the protrusion 151 on the innermost diameter side of the slinger extension ring portion 15 is located on the inner diameter side further than the protrusion 135 on the innermost diameter side of the cover portion 134.

The second labyrinth R2 extending in the axial direction is formed between the seal fitting cylindrical portion 121 and the outer diameter side slinger cylindrical portion 143. Part of the seal base 130 that is fixed to the inner peripheral surface 121*a* of the seal fitting cylindrical portion 121 is flat. Further, the outer peripheral surface 162*b* of the outer diameter side cover portion 162 fixed to the outer peripheral surface 143*b* of the outer diameter side slinger cylindrical portion 143 is flat. Therefore, the second labyrinth R2 is a labyrinth without concave or convex.

The third labyrinth R3 which is a gap extending in the axial direction is formed by the outer peripheral surface 136*b* and the seal protrusion 137 of the seal cylindrical portion 136, and the inner peripheral surface 143*a* of the outer diameter side slinger cylindrical portion 143. The third labyrinth R3 communicates with the first labyrinth R1 and the second labyrinth R2. Further, the third labyrinth R3 constitutes a labyrinth without concave or convex because the seal protrusions 137 and 137 are separated.

The seal protrusion 137 closest to the vehicle body side is configured such that a vehicle body side surface 137*c* is approximately on the same level as the vehicle body side surface 136*c* of the seal cylindrical portion 136. The fourth labyrinth R4 is a gap extending in the radial direction and is formed by the vehicle body side surface 137*c* of the seal protrusion 137 and a vehicle body side surface 136*c* of the seal cylindrical portion 136, and the wheel side surface 142*a* of the slinger ring portion 142. The fourth labyrinth R4 communicates with the first labyrinth R1, the second labyrinth R2, and the third labyrinth R3. The sealing device 10A of the present embodiment has a configuration in which one long and bent labyrinth is formed by communicating the first labyrinth R1 to the fourth labyrinth R4. The first labyrinth R1 to the fourth labyrinth R4 are configured to be non-contact without having a seal lip in contact with other members. Further, the second labyrinth R2 and the fourth labyrinth R4 are different from the first labyrinth R1 and the third labyrinth R3 in that the second labyrinth R2 and the fourth labyrinth R4 do not have concave or convex formed by the protrusion.

The sealing device 10A of the embodiment of the present invention has the outer diameter side seal cylindrical portion 123 extending outward in the radial direction from the vehicle body side end portion 121*d* of the seal fitting cylindrical portion 121 so as to face the vehicle body side end surface 2*d* of the outer ring 2. Therefore, foreign substances are inhibited from passing between the wheel side surface 123*a* of the outer diameter side seal ring portion 123 and the vehicle body side end surface 2*d* of the outer ring 2 and from entering a space between an outer peripheral surface 121*b* of the seal fitting cylindrical portion 121 and the inner peripheral surface 2*c* of the outer ring 2. Further, the foreign substances are easily discharged to the external space side by the first labyrinth R1 provided between the outer diameter side seal ring portion 123 and the slinger extension ring portion 15.

A plurality of protrusions 135 protruding toward the vehicle body side and being formed in an annular shape along the circumferential direction are formed on the vehicle body side surface 134b of the cover portion 134. Therefore, since the surface area of the first labyrinth R1 increases and the discharge effect of foreign substances increases, the amount of foreign substances reaching the seal lip, i.e., the radial lip, 132 is reduced, and the intrusion of foreign substances such as muddy water into the bearing device 1 is prevented.

The wheel side surface 15a of the slinger extension ring portion 15 has a plurality of protrusions 151 protruding toward the wheel side and being formed in an annular shape along the circumferential direction. Therefore, the surface area of the first labyrinth R1 increases, the discharge effect of foreign substances is improved, the amount of foreign substances reaching the seal lip, i.e., the radial lip, 132 is reduced, and the intrusion of foreign substances such as muddy water into the bearing device 1 is inhibited. Further, since the protrusion 151 provided on the slinger extension ring portion 15 is formed so as to expand in the diameter toward the wheel side, foreign substances need to enter against the shape of the protrusion 151, thereby inhibiting the intrusion of foreign substances. Further, due to the centrifugal force generated by the rotation of the bearing device 1, foreign substances are easily discharged into the external space along the shape of the protrusion 151.

The sealing device 10A has the first labyrinth R1 being a gap of which longitudinal section is meandering, the labyrinth R1 being formed by the vehicle body side surface 134b of the cover portion 134, the protrusion 135 of the cover portion 134, the wheel side surface 15a of the slinger extension ring portion 15, and the protrusion 151 of the slinger extension ring portion 15. In the first labyrinth R1, the intrusion of foreign substances such as muddy water is inhibited by the labyrinth having a complex path with a meandering longitudinal section, and the surface area of the first labyrinth R1 increases, thereby improving the discharge effect of foreign substances by the rotation of the bearing device 1.

The second labyrinth R2 is a labyrinth without concave or convex extending linearly in the axial direction, unlike the first labyrinth R1 of a meandering shape. The foreign substances such as muddy water that have reached the second labyrinth R2 are pushed out to the first labyrinth R1 side through the part of the seal base 130 constituting the second labyrinth R2 and through the outer peripheral surface 162b of the outer diameter side cover portion 162 as the bearing device 1 rotates.

Further, the sealing device 10A has the third labyrinth R3 that is a gap extending in the axial direction and communicating with the first labyrinth R1 and the second labyrinth R2, the third labyrinth R3 being formed by the outer peripheral surface 136b and the seal protrusion 137 of the seal cylindrical portion 136, and the inner peripheral surface 143a of the outer diameter side slinger cylindrical portion 143. The third labyrinth R3 inhibits the intrusion of foreign substances such as muddy water reaching the radial lip 132, which is a seal lip. Further, foreign substances such as muddy water are inhibited from moving along the seal protrusion 137 by providing a plurality of seal protrusions 137 at intervals in the axial direction, so that the amount of foreign substances reaching the radial lip 132 is further reduced.

Further, since the fourth labyrinth R4 communicating with the third labyrinth R3 is configured, the intrusion of foreign substances such as muddy water is further inhibited. Even when foreign substances have passed through the fourth labyrinth R4, the inner peripheral surface 136a of the seal cylindrical portion 136 inclines to the outer diameter side toward the vehicle body side. Therefore, the foreign substances such as muddy water that have passed through the fourth labyrinth R4 are easily discharged to the external space side through the fourth labyrinth R4 along the inner peripheral surface 136a of the seal cylindrical portion 136.

Modification of Slinger Member

Figure 4B:
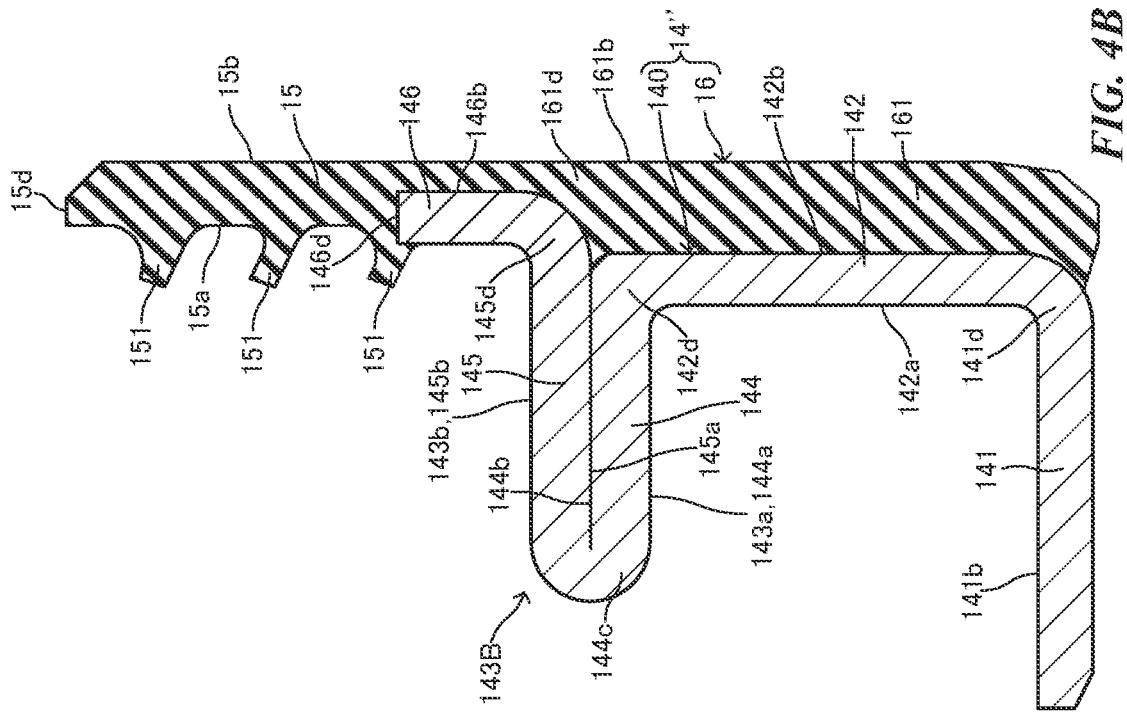
FIG. 4A and FIG. 4B are schematic longitudinal sectional views illustrating modified examples of the slinger member of the embodiment.
Figure 4A:
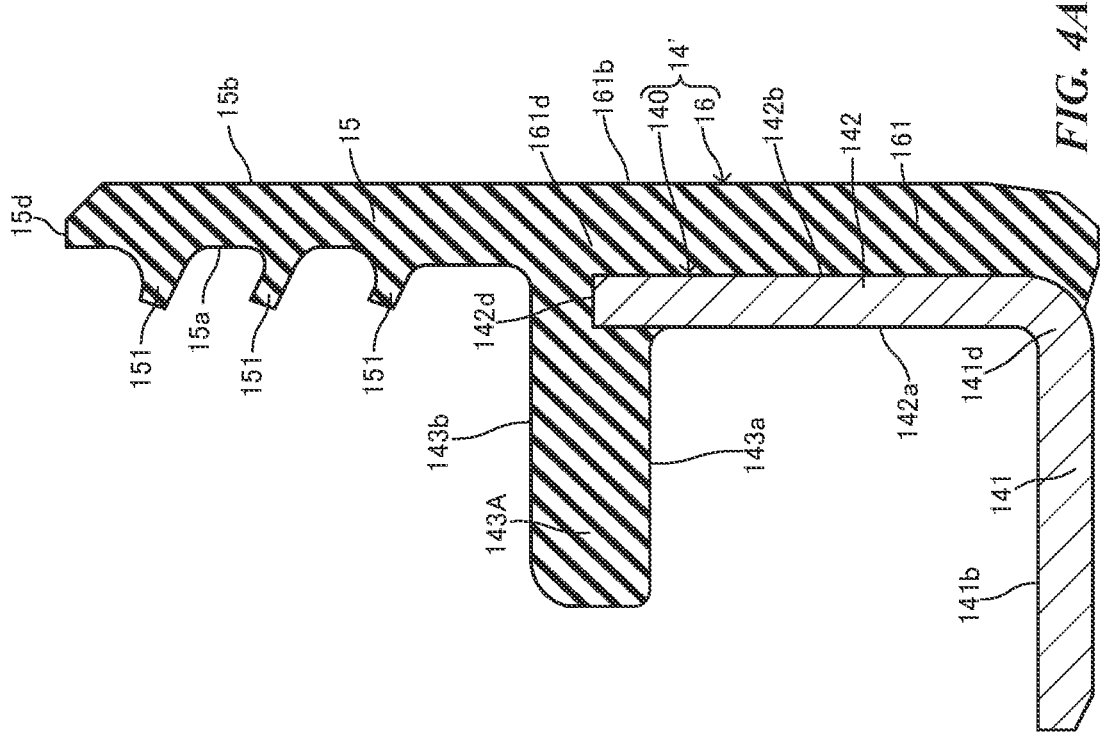

Next, with reference to FIG. 4A and FIG. 4B, slinger members 14' and 14", which are modifications of the slinger member 14 of the second embodiment, are described.

The slinger member 14' illustrated in FIG. 4A is different from the slinger member 14 in the second embodiment in the configuration of the outer diameter side slinger cylindrical portion 143. In the slinger member 14 of FIG. 3, the outer diameter side slinger cylindrical portion 143 is constituted with the slinger base 140. On the other hand, the slinger member 14' of the modification illustrated in FIG. 4A includes an outer diameter side slinger cylindrical portion 143A, i.e. a cylindrical portion of the slinger member on the outer diameter side, extending from the slinger cover 16.

The slinger base 140 is configured in a cylindrical shape, the section of which on one side is approximately inverted L-shaped. The slinger member 14 includes the slinger fitting cylindrical portion 141 to be fitted to the outer peripheral surface 4b of the inner ring member 4 that is an inner member, and the slinger ring portion 142 extending from the vehicle body side end portion 141d of the slinger fitting cylindrical portion 141 to the outer diameter side. The slinger base 140 is constituted with the slinger fitting cylinder portion 141 and the slinger ring portion 142. The slinger cover 16 includes the vehicle body side cover portion 161 that covers almost the entire surface of the vehicle body side surface 142b of the slinger ring portion 142. The outer diameter side slinger cylindrical portion 143A is a member constituted with an elastic body integrally configured with the slinger cover 16. The outer diameter side slinger cylindrical portion 143A extends from the outer diameter side end portion 161d of the vehicle body side cover portion 161 to the wheel side, so that the outer diameter side slinger cylindrical portion 143A extends from the outer diameter side end portion 142d of the slinger ring portion 142 to the wheel side. Further, the outer diameter side slinger cylindrical portion 143A covers the outer diameter side end portion 142d and part of the wheel side surface 142a of the slinger ring portion 142. Thus, the outer diameter side slinger cylindrical portion 143A can be configured separately from the slinger base 140.

Next, the slinger member 14" illustrated in FIG. 4B is described. In FIG. 4B, the slinger member 14" includes an outer diameter side slinger cylindrical portion 143B, i.e., a cylindrical portion of the slinger member on the outer diameter side, to which the slinger cover 16 is not fixed. The outer diameter side slinger cylindrical portion 143B is the same as the outer diameter side slinger cylindrical portion 143 of the first embodiment in that it is configured as part of the slinger base 140, but is different in that the outer diameter side slinger cylindrical portion 143B is constituted with the first cylindrical portion 144 and the second cylindrical portion 145.

The outer diameter side slinger cylindrical portion 143B includes the first cylindrical portion 144 extending from the outer diameter side end portion 142d of the slinger ring portion 142 to the wheel side, and the second cylindrical portion 145 returning from a wheel side end portion 144c of the first cylindrical portion 144 and extending to the vehicle body side. A vehicle body side end portion 145d of the second cylindrical portion 145 is located on the vehicle body side further than the slinger ring portion 142. An outer peripheral surface 144b of the first cylindrical portion 144 and an inner peripheral surface 145a of the second cylindrical portion 145 are abutted on each other. An inner peripheral surface 144a of the first cylindrical portion 144 is the inner peripheral surface 143a of the outer diameter side slinger cylindrical portion 143B. An outer peripheral surface 145b of the second cylindrical portion 145 is the outer peripheral surface 143b of the outer diameter side slinger cylindrical portion 143B.

The slinger base 140 has an outer diameter side ring portion 146 extending from the vehicle body side end portion 145d of the second cylindrical portion 145 to the outer diameter side. The outer diameter side ring portion 146 is located on the vehicle body side further than the slinger ring portion 142, and an outer diameter side end portion 146d extends to a position that axially overlaps part of the innermost diameter protrusion 151 of the slinger extension ring portion 15. The slinger extension ring portion 15 has a configuration in which part of the inner diameter side covers a vehicle body side surface 146b of the outer diameter side ring portion 146 of the slinger base 140.

Modification of Second Embodiment

Figure 5:
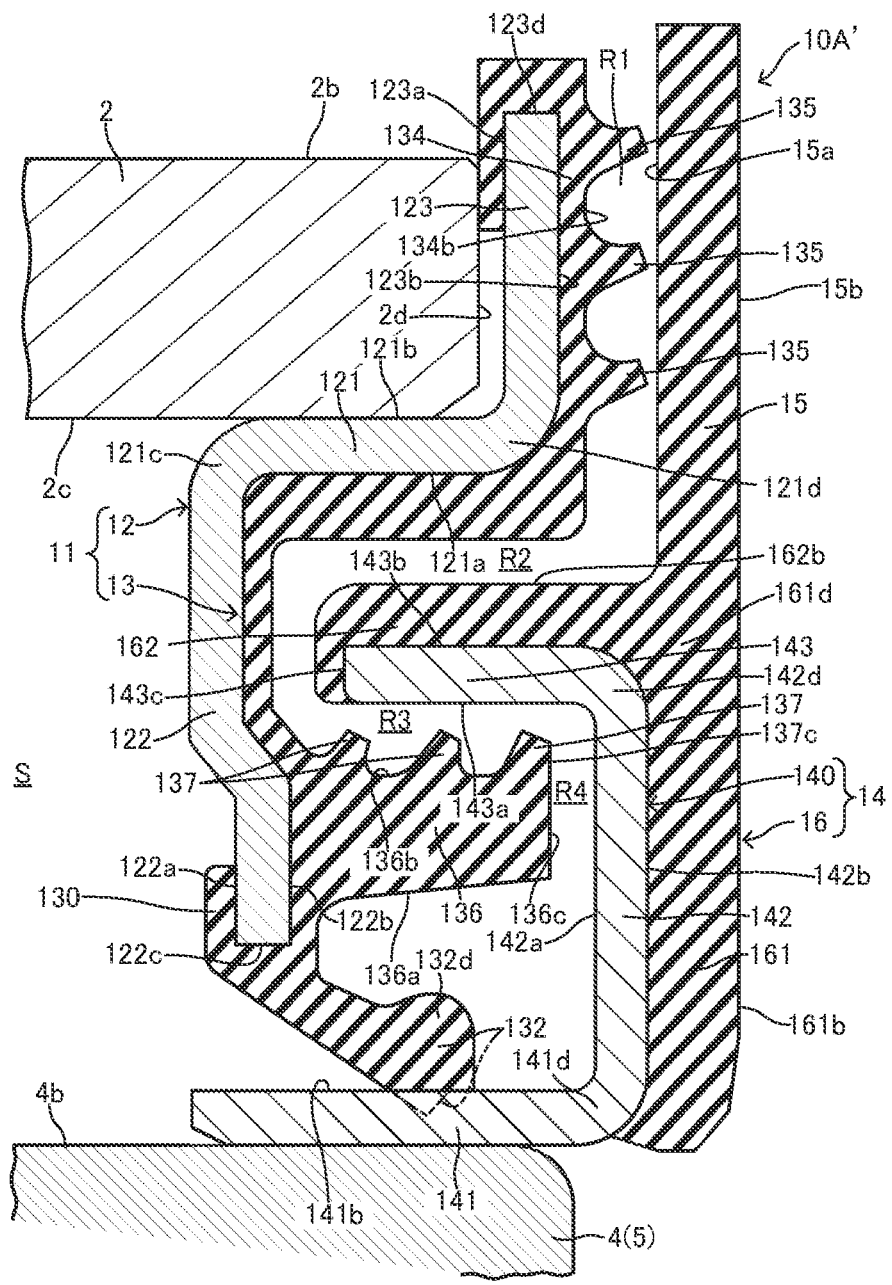
FIG. 5 is a schematic longitudinal sectional view diagrammatically illustrating the sealing device according to the modification of the embodiment.

Next, with reference to FIG. 5, a sealing device 10A', which is a modification of the sealing device 10A of FIG. 3 is described. The description of the configuration and effect of the portion common to the second embodiment is omitted.

The sealing device 10A' of FIG. 5 is different from the sealing device 10A of FIG. 3 in the configuration of the protrusion 135 of the outer diameter side seal ring portion 123 and the slinger extension ring portion 15. Other configurations are approximately the same as those in the sealing device 10A in FIG. 3.

The protrusion 135 fixed to the outer diameter side seal ring portion 123 of the seal portion 13 is formed so as to expand in the diameter to the vehicle body side. Further, the wheel side surface 15a of the slinger extension ring portion 15 has a planar shape that does not have a protrusion protruding to the wheel side. The slinger extension ring portion 15 is formed so as to extend to the outer diameter side further than the seal member 11. In this modification, the first labyrinth R1 is formed by the wheel side surface 15a of the slinger extension ring portion 15, the vehicle body side surface 123b of the outer diameter side seal ring portion 123, and the protrusion 135 fixed to the outer diameter side seal ring portion 123.

The sealing device 10A' inhibits the intrusion of foreign substances such as muddy water by the first labyrinth R1, and discharges the foreign substances to the outside by the centrifugal force associated with the rotation of the bearing device 1. The foreign substances that have entered the first labyrinth R1 are discharged to the external space side along the shape of the protrusion 135 of the cover portion 134 by the centrifugal force. Further, the foreign substances adhered to the wheel side surface 15a of the slinger extension ring portion 15 are discharged to the external space side along the wheel side surface 15a.

Third Embodiment

Figure 6:
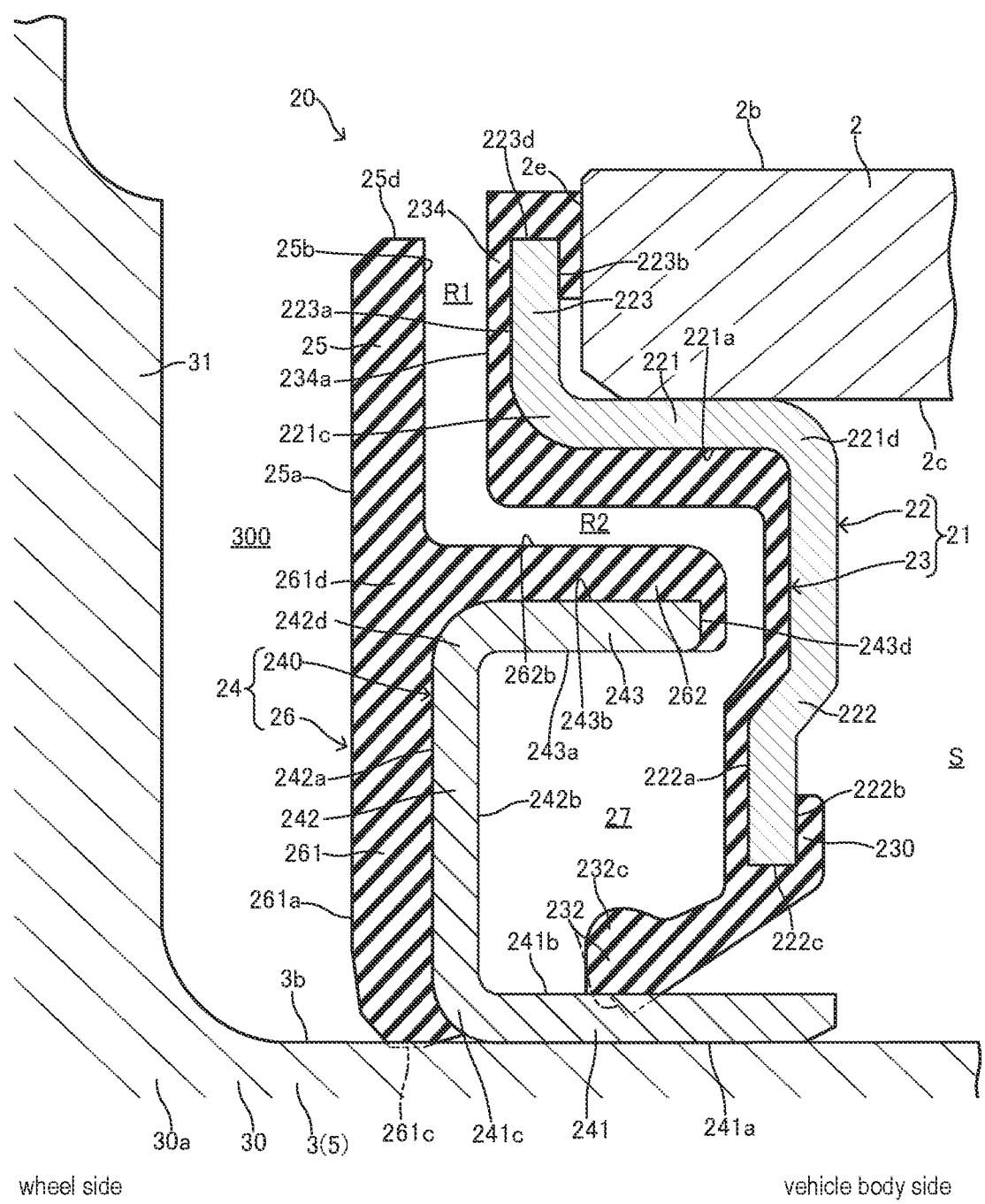
FIG. 6 is an enlarged view of the part Y of FIG. 1, and is a schematic longitudinal sectional view diagrammatically illustrating a sealing device according to the third embodiment.

Next, with reference to FIG. 6, which is an enlarged view of the part Y of FIG. 1, a sealing device 20 to be attached to the wheel side end portion of the annular space S is described. In the sealing device 20 illustrated in FIG. 6, the outside in the axial direction is described as the wheel side and the inside in the axial direction is described as the vehicle body side. Further, the description of the configuration and effect of the portion common to the sealing device 10A of FIG. 3 described above is omitted.

Briefly describing the sealing device 20 of FIG. 6, the sealing device 10A of the second embodiment illustrated in FIG. 3 is reverted horizontally, the sealing device 20 does not have the protrusion 135 of the cover portion 134 provided on the outer diameter side seal ring portion 123, the protrusion 151 of the slinger extension ring portion 15, or the seal cylindrical portion 136.

The sealing device 20 of FIG. 6 has a seal member 21 and a slinger member 24. The seal member 21 has a core body 22 and a seal portion 23. The core body 22 has a seal fitting cylindrical portion 221, an inner diameter side seal ring portion 222, i.e., a ring portion of the seal member on the inner diameter side, and an outer diameter side seal ring portion 223, i.e., a ring portion of the seal member on the outer diameter side. The seal fitting cylindrical portion 221 is fitted to the inner peripheral surface 2c of the outer ring 2. The inner diameter side seal ring portion 222 extends from a vehicle body side end portion 221d of the seal fitting cylindrical portion 221 to the inner diameter side. The outer diameter side seal cylindrical portion 223 extends from a wheel side end portion 221c of the seal fitting cylindrical portion 221 to the outer diameter side. The outer diameter side seal ring portion 223 faces a wheel side end surface 2e of the outer ring 2, and, unlike the second embodiment, is formed so as not to protrude on the outer diameter side further than the outer peripheral surface 2b of the outer ring 2.

The seal portion 23 is constituted with an elastic body such as rubber and is integrally molded to the core body 22 by vulcanization adhesion. The seal portion 23 has a seal base 230 that covers the entire surface on the wheel side of parts of the core body 22 and a radial lip 232 being a seal lip in contact with an outer peripheral surface 241b of a slinger fitting cylindrical portion 241 of the slinger member 24. The seal base 230 wraps from part of the inner diameter side of a vehicle body side surface 222b of the inner diameter side seal ring portion 222 to an inner diameter side end portion 222c to cover the entire of a wheel side surface 222a. Further, the seal base 230 covers the entire surface of an inner peripheral surface 221a of the seal fitting cylindrical portion 221. Then, the seal base 230 covers a wheel side surface 223a of the outer diameter side seal ring portion 223, wraps around an outer diameter side end portion 223d, and reaches part of the outer diameter side of a vehicle body side surface 223b. The region of the seal base 230 covering the wheel side surface 223a of the outer diameter side seal ring portion 223 is a cover portion 234 provided for the wheel side surface 223a of the outer diameter side seal ring portion 223. The radial lip 232 reduces in the diameter while extending from the seal base 230 to the wheel side and comes into elastic contact with the outer peripheral surface 241b of the slinger fitting cylindrical portion 241 of the slinger member 24. A wheel side tip portion 232c of the radial lip 232 is bulged toward the outer diameter side.

The slinger member 24 has a slinger base 240 and a slinger cover 26. The slinger member 24 of the present embodiment is fitted, not only to the inner ring member 4, but also to an outer peripheral surface 3b of the hub wheel 3. The slinger base 240 is formed by pressing a steel plate such as SPCC or SUS, and is a cylindrical shape as illustrated in FIG. 6, the section of which on one side is approximately C-shaped. The slinger member 24 has the slinger fitting cylindrical portion 241 to be fitted to the outer peripheral surface 3b of the hub wheel 3, which is an inner member. The slinger member 24 includes a slinger ring portion 242 extending from a wheel side end portion 241c of the slinger fitting cylindrical portion 241 to the outer diameter side. The slinger member 24 includes an outer diameter side slinger cylindrical portion 243, i.e., a cylindrical portion of the slinger member on the outer diameter side, extending from an outer diameter side end portion 242d of the slinger ring portion 242 to the vehicle body side. The slinger base 240 is constituted with the slinger fitting cylindrical portion 241, the slinger ring portion 242, and the outer diameter side slinger cylindrical portion 243.

The slinger cover 26 is fixed to the slinger base 240. The slinger cover 26 includes a wheel side cover portion 261 that covers the entire surface of a wheel side surface 242a of the slinger ring portion 242, and an outer diameter side cover portion 262 that covers the whole of an outer peripheral surface 243b and a vehicle body side end portion 243d of the outer diameter side slinger cylindrical portion 243. The slinger cover 26 is configured not to cover an inner peripheral surface 243a of the outer diameter side slinger cylindrical portion 243 and a vehicle body side surface 242b of the slinger ring portion 242. The slinger cover 26 includes a slinger extension ring portion 25 extending to the outer diameter side from the wheel side cover portion 261. Thus, the slinger member 24 has the slinger extension ring portion 25 located on the outer diameter side further than the outer diameter side end portion 242d of the slinger ring portion 242.

The slinger extension ring portion 25 faces the wheel side end surface 2e of the outer ring 2 via the outer diameter side seal ring portion 223; and being different from the second embodiment, an outer diameter side end portion 25d is formed so as not to protrude to the outer diameter side further than an outer peripheral surface 22b of the outer ring 2. The slinger extension ring portion 25 of the present embodiment is constituted such that a wheel side surface 25a and a wheel side surface 261a of the wheel side cover portion 261 are approximately on the same level.

In the sealing device 20, the first labyrinth R1 is a gap extending in the radial direction and being formed between a wheel side surface 234a of the cover portion 234 and a vehicle body side surface 25b of the slinger extension ring portion 25. Further, the second labyrinth R2 is formed between an outer peripheral surface 262b of the outer diameter side cover portion 262 of the slinger cover 26 fixed to the outer peripheral surface 243b of the outer diameter side slinger cylindrical portion 243 and the seal base 230 fixed to the inner peripheral surface 221a of the seal fitting cylindrical portion 221.

The sealing device 20 has the first labyrinth R1 extending in the radial direction and the second labyrinth R2 extending in the axial direction and communicating with the first labyrinth R1, thereby inhibiting the intrusion of foreign substances such as muddy water and easily discharging the foreign substances to the outer space even when the foreign substances have entered. Further, the sealing device 20 has a space 27 surrounded with the inner peripheral surface 243a of the outer diameter side slinger cylindrical portion 243, the vehicle body side surface 242b of the slinger ring portion 242, the outer peripheral surface 241b of the slinger fitting cylindrical portion 241, the radial lip 232, and the seal base 230 fixed to the wheel side surface 222a of the inner diameter side seal ring portion 222. The space 27 communicates with the second labyrinth R2, and even when foreign substances such as muddy water pass through the second labyrinth R2, the foreign substances remain in the space 27, and further intrusion is inhibited. Then, the discharge of the foreign substances that have reached the space 27 from the sealing device 20 is promoted as the bearing device 1 rotates.

Further, when the sealing device 20 is attached to the wheel side end portion of the annular space S, an annular space 300 is formed by the rising base 31 located on the wheel side further than the sealing device 20, the slinger ring portion 242 of the slinger member 24, and the slinger extension ring portion 25. Foreign substances such as muddy water that have entered from the external space tend to be accumulated in the space 300. Even when the foreign substances that have reached the space 300 try to move to the annular space S side through the outer peripheral surface 3b of the hub wheel 3, the slinger member 24 of the sealing device 20 inhibits further intrusion of the foreign substances into the annular space S side. Then, the foreign substances remaining in the space 300 are discharged from the space 300 to the outer space by the centrifugal force accompanying the rotation of the inner ring 5. Further, an inner diameter side end portion 261c of the wheel side cover portion 261 of the slinger cover 26 is in close contact with the outer peripheral surface 3b of the hub wheel 3 in an elastically deformed manner, referring to the two-dot chain line in the figure illustrating the original shape before deformation. Thereby, foreign substances are inhibited from entering a space between an inner peripheral surface 241a of the slinger fitting cylindrical portion 241 of the slinger member 24 and the outer peripheral surface 3b of the hub wheel 3.

The configurations of the sealing devices 10, 10A, 10A', 20 can include configurations of other sealing devices, and are not limited to the configurations described above or illustrated in the figures. For example, the shapes of various seal lips described above are not limited to those described above or those illustrated in the figures, and the number of the seal lips and the location where the seal lips are provided are not limited. Further, the slinger cover 16 of the sealing devices 10A, 10A' can be constituted with a magnetic material such as magnetic rubber and magnetized by the N poles and the S poles provided alternately in the circumferential direction, thereby constituting a magnetic encoder. Further, the slinger covers 16, 26 can be formed of a hard resin material such as a synthetic resin, not an elastic body such as rubber. In such a case, the slinger extension ring portions 15, 25 can also be formed of a hard resin material such as a synthetic resin, not an elastic body. Further, the slinger extension ring portions 15, 25 are not limited to be approximately on the same level as the vehicle body side cover portion 161 and the wheel side cover portion 261 of the slinger covers 16, 26. The slinger extension ring portions 15, 25 can be provided so as to protrude outward in the axial direction further than the vehicle body side cover portion 161 and the wheel side cover portion 261.

Further, the sealing devices 10A, 10A', 20 can be configured not to include the cover portions 134, 234. In such a case, it is desirable that the outer diameter side seal ring portions 123, 223 abut the axially outer side end surfaces 2d, 2e of the outer ring 2.

In the sealing device 10A, the protrusion 135 on the outermost diameter side of the cover portion 134 is located on the outer diameter side further than the protrusion 151 on the outermost diameter side of the slinger extension ring portion 15, but the present invention is not limited to such a configuration. Further, the protrusion 151 on the innermost diameter side of the slinger extension ring portion 15 is located on the inner diameter side further than the protrusion 135 on the innermost diameter side of the cover portion 134, but the present invention is not limited to such a configuration. The configuration such as the number and the sectional shape of the protrusion 151 of the slinger extension ring portion 15 and the protrusion 135 of the cover portion 134 is not limited to the above-described configuration and figures. Further, the numbers of the protrusions 151 of the slinger extension ring portion 15 and the protrusions 135 of the cover portion 134 can be different.

Further, in the slinger member 14 of FIG. 4B, the outer diameter side ring portion 146 of the slinger base 140 can extend to the outer diameter side further than those illustrated in FIG. 4B. Further, the slinger extension ring portion 15 can be constituted with the outer diameter side ring portion 146 of the slinger base 140 extending to the outer diameter side so as to face the vehicle body side end surface 2d of the outer ring 2. Even when the slinger extension ring portion 15 is formed only by the outer diameter side ring portion 146 of the slinger base 140, the protrusion 151 formed of an elastic body, synthetic resin, or the like can be provided on the wheel side surface of the outer diameter side ring portion 146 or the protrusion 151 can be integrally provided on the outer diameter side ring portion 146. Further, the first cylindrical portion 144 and the second cylindrical portion 145 that constitute the outer diameter side slinger cylindrical portion 143 can be separated, and part of the slinger cover 16 can be provided therebetween.

Further, the sealing device 20 in FIG. 6 can have the side lip, the protrusion, the seal cylindrical portion, or the like provided in the sealing devices 10, 10A, 10A' of FIG. 2 to FIG. 5. The sealing devices 10, 10A, 10A' of FIG. 2 to FIG. 5 described above can be mounted on the wheel side end portion of the annular space S.

EXPLANATION OF SIGNS 1 bearing device
2 outer ring (outer member)
2c inner peripheral surface
3 hub wheel (inner member)
3b outer peripheral surface
4 inner ring member (inner member)
4b outer peripheral surface
5 inner ring
10,20 sealing device
11,21 seal member
12,22 core body
121,221 seal fitting cylindrical portion
122,222 inner diameter side seal ring portion
131 side lip (seal lip)
132,232 radial lip (seal lip)
14,24 slinger member
141,241 slinger fitting cylindrical portion
141d vehicle side end portion (outer side end portion in axial direction)
241c wheel side end portion (outer side end portion in axial direction)
142,242 slinger ring portion
142d,242d outer diameter side end portion
143,243 outer diameter side slinger cylindrical portion
15,25 slinger extension ring portion
R1 first labyrinth
R2 second labyrinth
S annular space

The invention claimed is:

1. A sealing device for sealing an annular space, the sealing device being attached on an axially outer side end portion of the annular space formed between an outer member and an inner member which coaxially rotate in a relative manner, the axially outer side end portion of the annular space being on an outer space side,
the sealing device comprising:
a seal member to be fitted to an inner peripheral surface of the outer member; and
a slinger member to be fitted to an outer peripheral surface of the inner member,
the seal member comprising:
a core body; and
a seal lip which is integrated with the core body and is constituted with an elastic body in contact with the slinger member,
the core body comprising:
a seal fitting cylindrical portion to be fitted to the inner peripheral surface of the outer member; and
an inner diameter side seal ring portion extending into an inner side in a radial direction from an axially inner side end portion of the seal fitting cylindrical portion,
the slinger member comprising:
a slinger fitting cylindrical portion to be fitted to the outer peripheral surface of the inner member,
a slinger ring portion extending from an axially outer side end portion of the slinger fitting cylindrical portion to an outer side in the radial direction,
an outer diameter side slinger cylindrical portion extending from an outer diameter side end portion of the slinger ring portion to an axially inner side and facing an inner peripheral surface of the seal fitting cylindrical portion, and
a slinger extension ring portion provided on the outer side in the radial direction further than the outer diameter side end portion of the slinger ring portion, facing an axially outer side end surface of the outer member, and extending in the radial direction,
wherein a first labyrinth is formed between the slinger extension ring portion and the outer member, an outer side end portion of the first labyrinth in the radial direction being open toward an outer space, the first labyrinth being a gap extending in the radial direction,
wherein a second labyrinth is formed between the outer diameter side slinger cylindrical portion and the seal fitting cylindrical portion, the second labyrinth communicating with the first labyrinth and being a gap extending in an axial direction, and
wherein the slinger extension ring portion is made exclusively of rubber or magnetic rubber.

2. The sealing device according to claim 1,
the core body further comprising an outer diameter side seal ring portion extending from an axially outer side end portion of the seal fitting cylindrical portion to the outer side in the radial direction so as to face the axially outer side end surface of the outer member,
wherein the first labyrinth is formed between the outer diameter side seal ring portion and the slinger extension ring portion.

3. The sealing device according to claim 2,
wherein the outer diameter side seal ring portion has a cover constituted with an elastic body on an axially outer side surface, and
wherein the first labyrinth is formed between the cover and the slinger extension ring portion.

4. The sealing device according to claim 3,
wherein a plurality of protrusions are provided on an axially outer side surface of the cover, the protrusions projecting outward in the axial direction and being provided annularly along a circumferential direction.

5. The sealing device according to claim 1,
wherein a plurality of protrusions are provided on an axially inner surface of the slinger extension ring portion, the protrusions projecting inward in the axial direction and being provided annularly along a circumferential direction.

6. The sealing device according to claim 5,
wherein the protrusions provided at the slinger extension ring portion are formed so as to increase in diameter inward in the axial direction.

7. The sealing device according to claim 2,
wherein a plurality of protrusions are provided on an axially inner surface of the slinger extension ring portion, the protrusions projecting inward in the axial direction and being provided annularly along a circumferential direction.

8. The sealing device according to claim 3,
wherein a plurality of protrusions are provided on an axially inner surface of the slinger extension ring portion, the protrusions projecting inward in the axial direction and being provided annularly along a circumferential direction.

9. The sealing device according to claim 4,
wherein a plurality of protrusions are provided on an axially inner surface of the slinger extension ring portion, the protrusions projecting inward in the axial direction and being provided annularly along the circumferential direction.

10. The sealing device according to claim 7,
wherein the protrusions provided at the slinger extension ring portion are formed so as to increase in diameter inward in the axial direction.

11. The sealing device according to claim 8,
wherein the protrusions provided at the slinger extension ring portion are formed so as to increase in diameter inward in the axial direction.

12. The sealing device according to claim 9,
wherein the protrusions provided at the slinger extension ring portion are formed so as to increase in diameter inward in the axial direction.

\* \* \* \* \*